US008629908B2

(12) United States Patent
Schutte et al.

(10) Patent No.: US 8,629,908 B2
(45) Date of Patent: Jan. 14, 2014

(54) METHOD FOR DETECTING A MOVING OBJECT IN A SEQUENCE OF IMAGES CAPTURED BY A MOVING CAMERA, COMPUTER SYSTEM AND COMPUTER PROGRAM PRODUCT

(75) Inventors: Klamer Schutte, Zoetermeer (NL); Johannes Gerardus Maria Schavemaker, Naaldwijk (NL); Judith Dijk, Den Haag (NL); Dirk-Jan Jeroen De Lange, Den Haag (NL)

(73) Assignee: Nederlandse Organisatie Voor Toegepast—Natuurwetenschappelijk Onderzoek TNO, Delft (NL)

( * ) Notice: Subject to any disclaimer, the term of this patent is extended or adjusted under 35 U.S.C. 154(b) by 759 days.

(21) Appl. No.: 12/515,445

(22) PCT Filed: Nov. 20, 2007

(86) PCT No.: PCT/NL2007/050574
§ 371 (c)(1),
(2), (4) Date: Jul. 31, 2009

(87) PCT Pub. No.: WO2008/063058
PCT Pub. Date: May 29, 2008

(65) Prior Publication Data
US 2010/0053333 A1 Mar. 4, 2010

(30) Foreign Application Priority Data
Nov. 20, 2006 (EP) .................................... 06077053

(51) Int. Cl.
*H04N 5/225* (2006.01)
(52) U.S. Cl.
USPC ......................................... 348/169; 382/299

(58) Field of Classification Search
USPC .......................................... 348/169, 159, 142
See application file for complete search history.

(56) References Cited

U.S. PATENT DOCUMENTS

| 5,067,014 A | 11/1991 | Bergen et al. |
| 5,406,501 A | 4/1995 | Florent |

(Continued)

FOREIGN PATENT DOCUMENTS

| EP | 0 492 724 A1 | 7/1992 |
| WO | 97/49061 A1 | 12/1997 |

OTHER PUBLICATIONS

Ritter, Gerhard X., et al.; Handbook of Computer Vision Algorithms in Image Algebra, 1996 CRC press, Inc., New York, pp. 143-160.

(Continued)

*Primary Examiner* — Kevin Bates
(74) *Attorney, Agent, or Firm* — Fleit Gibbons Gutman Bongini & Bianco PL; Martin Fleit; Paul D. Bianco

(57) ABSTRACT

The invention relates to a method for detecting a moving object in a sequence of images captured by a moving camera. The method comprises the step of constructing a multiple number of difference images by subtracting image values in corresponding pixels of multiple pairs of images being based on captured images. Further, the method comprises the step of retrieving a moving object by extracting spatial information of pixels in the multiple number of constructed difference images having relatively large image values. In addition, from a pair of images in the construction step an image is a representation of a high resolution image having a higher spatial resolution than original captured images on which the high resolution image is based.

12 Claims, 4 Drawing Sheets

(56) References Cited

U.S. PATENT DOCUMENTS

| | | | |
|---|---|---|---|
| 5,917,963 A * | 6/1999 | Miyake | 382/300 |
| 6,360,022 B1 | 3/2002 | Lubin et al. | |
| 6,931,146 B2 * | 8/2005 | Aoki et al. | 382/107 |
| 7,860,344 B1 * | 12/2010 | Fitzpatrick et al. | 382/291 |
| 2005/0104958 A1 * | 5/2005 | Egnal et al. | 348/143 |
| 2006/0050785 A1 | 3/2006 | Watanabe et al. | |
| 2009/0052743 A1 * | 2/2009 | Techmer | 382/107 |
| 2010/0027913 A1 * | 2/2010 | Konishi | 382/299 |

OTHER PUBLICATIONS

Park, Sung Cheol et al.; Super-Resolution Image Reconstruction: A Technical Overview; IEEE Signal Processing Magazine; 1053-5888/03; May 2003.

Schutte, Klamer et al.; Signal Conditioning Algorithms For Enhanced Tactical Sensor Imagery; Infrared Imaging Systems; Design, Analysis, Modeling, and Testing XIV, Gerald C. Holst, Proceedings of SPIE vol. 5073 (2003).

Nagahara, Hajime et al.; Super-Resolution From An Omnidirectional Image Sequence; Graduate School of Engineering Science, Osaka University; 0-7-803-6456-2; 2000 IEEE, pp. 2559-2564.

Cohen, B. et al.; Polyphase Back-Projection Filtering For Image Resolution Enhancement; IEE Proc-Vis, Image Signal Process., vol. 147 No. 4, Aug. 2000.

Written Opinion of the International Searching Authority published May 20, 2009 for PCT/NL2007/050574 filed Nov. 20, 2007.

International Preliminary Report on Patentability published May 20, 2009 for PCT/NL2007/050574 filed Nov. 20, 2007.

International Search Report mailed Mar. 20, 2008 for PCT/NL2007/050574 filed Nov. 20, 2007.

* cited by examiner

METHOD FOR DETECTING A MOVING OBJECT IN A SEQUENCE OF IMAGES CAPTURED BY A MOVING CAMERA, COMPUTER SYSTEM AND COMPUTER PROGRAM PRODUCT

The invention relates to a method for detecting a moving object in a sequence of images captured by a moving camera, comprising the steps of constructing a multiple number of difference images by subtracting image values in corresponding pixels of multiple pairs of images being based on captured images and retrieving a moving object by extracting spatial information of pixels in the multiple number of constructed difference images having relatively large image values.

Such a method is known from the prior art, wherein a moving object, e.g. a point object, is detected by capturing temporal subsequent images by a moving camera and constructing difference images. In the process of constructing a difference image, image values in the corresponding pixels of a pair of images based on the captured images are subtracted and assigned to the corresponding pixel of the difference image. As a result, static information in the captured images is substantially removed.

Further, spatial information of pixels in the multiple number of constructed difference images having relatively large image values is extracted. The idea is that dynamic information in the original captured images is still present in the difference images as a moving object, in particular a moving point object, might in a first image be present in a first pixel and a second image be present in a second pixel. By finding the location of the pixels in which information substantially differs, potential spatial information of moving object might be successfully retrieved.

It is an object of the invention to improve a method for detecting a moving object in a sequence of images captured by a moving camera according to the preamble. Thereto, according to the invention, in the construction step, an image from a pair of images is a representation of a high resolution image having a higher spatial resolution than original captured images on which the high resolution image is based.

By using, in the construction step, an image that is a representation of a high resolution image having a higher spatial resolution than original captured images on which the high resolution image is based, the occurrence of artefacts, such as noise and/or aliasing effects, in the captured images can be reduced or even suppressed. As difference images comprise artefacts and moving objects, the moving objects, such as point objects, can easier be detected in a difference image that is formed in the construction step according to the invention.

Forming a high resolution image based on images having a lower resolution is generally known as applying superresolution techniques. Specific algorithms for forming a superresolution image can e.g. be found in "Super-Resolution Image Reconstruction: A Technical Overview" by Sung Cheol Park, Min Kyu Park and Moon Gi Kang, published in IEEE Signal Processing Magazine, May 2003, pages 21-36. Typically, the low resolution images represent different views on a scene, such that they are shifted with subpixel precision. If the low resolution images are shifted by integer pixels, each image contains the same information, so that no new information is available to form the high resolution image. In order to get a different view on a scene, the camera is moving, so that between capturing events the location and/or orientation of the camera is shifted. The shift needs to be known with subpixel precision for meaningfully comparing subsequent captured pictures. The shift might be retrieved either by direct camera removal sensing or indirectly by removal estimation from image information in the captured pictures.

In a first embodiment according to the invention the representation of the high resolution image is obtained by applying a camera model to the high resolution image resulting in an image having substantially the same spatial resolution as the original captured images on which the high resolution image is based. By application of the camera model the high resolution image is thus represented in a lower resolution domain, so that the representation of the high resolution image can meaningfully be input to the subtraction operation that is performed during the construction step.

It is noted that the camera model synthesizes optical effects of a real camera, such as fillfactor effects and convolution, but might preserve some artefact reduction, such as suppression of noise levels and/or aliasing. In terms of background representation the process of forming a high resolution image based on original captured images and applying a camera model to the high resolution image generates an improved image compared with a single original captured image. From an information theory point of view this can be explained in that information of at least two captured images with background information is employed.

In an implementation according to the invention the other image of the pair of images is an image captured by the camera so that both images of the pair of images are in substantial the same low resolution domain. Also further implementations for the other image of the pair of images are possible, e.g. an image that is based on a multiple number of images captured by the camera and that is not constructed in a high resolution domain.

In a second embodiment according to the invention both images from a pair of images in the constructing step are a representation of high resolution images, respectively, each having a higher spatial resolution than original captured images on which the high resolution images are based. As a consequence, both images that are input to the subtraction operation in the constructing step have better performance in terms of unwanted artefacts, so that moving objects can even better be detected in the obtained difference image.

Optionally, the representation of the high resolution images is in the low resolution domain by applying a camera model to both high resolution images. However, it is also possible that the high resolution images are represented in the high resolution domain for performing the subtraction operation.

Advantageously, original captured images on which a high resolution image is based form temporal subsequent images in the sequence of images captured by the camera. Thereby, correlation in background information of subsequent images in the sequence of captured images is optimally used in forming the high resolution image. However, also other image allocations can be constructed, e.g. using even or odd images in the sequence of captured images or using images at random.

Further, the invention relates to a computer system.

Additionally, the invention relates to a computer program product.

Other advantageous embodiments according to the invention are described in the following claims.

By way of example only, embodiments of the present invention will now be described with reference to the accompanying figures in which FIG. 1 shows a camera set-up;

The figures are merely schematic views of preferred embodiments according to the invention. In the figures, the same reference numbers refer to equal or corresponding parts.

Figure 1:
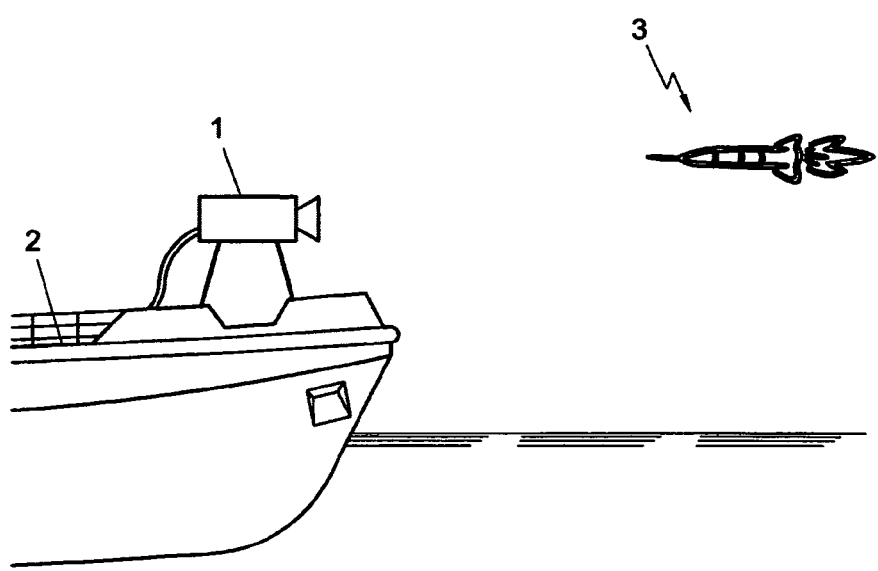

FIG. 1 shows a camera set-up providing images to be processed by a method according to the invention for detecting a moving object. A camera 1 is placed on a platform 2 e.g. on a ship deck or on a mobile platform. The camera is implemented as an IR camera. During operation the camera 1 performs a rotational and/or translation displacement so that images are captured having different views on the scene that is captured by the camera 1. Displacement of the camera might be induced by an actuator or by the camera itself having a dithering feature wherein at least an optical element or the sensor is moved in time. The camera 1 captures a sequence of images at time instants $t_{i-3}$, $t_{i-2}$, $t_{i-1}$, $t_i$, $t_{i+1}$, $t_{i+2}$, $t_{i+3}$, $t_{i+4}$, etc, at a rate of e.g. 25 images per second. However, also other rates can be applied. Corresponding captured images are denoted as $I_{i-3}$, $I_{i-2}$, $I_{i-1}$, $I_i$, $I_{i+1}$, $I_{i+2}$, $I_{i+3}$, $I_{i+4}$, etc. The purpose of capturing images of the scene is to detect moving objects, in particular point objects such as missiles 3 approaching the platform 2 on which the camera 1 is placed. The method according to the invention can be applied in the field of defence or security systems.

Figure 2:
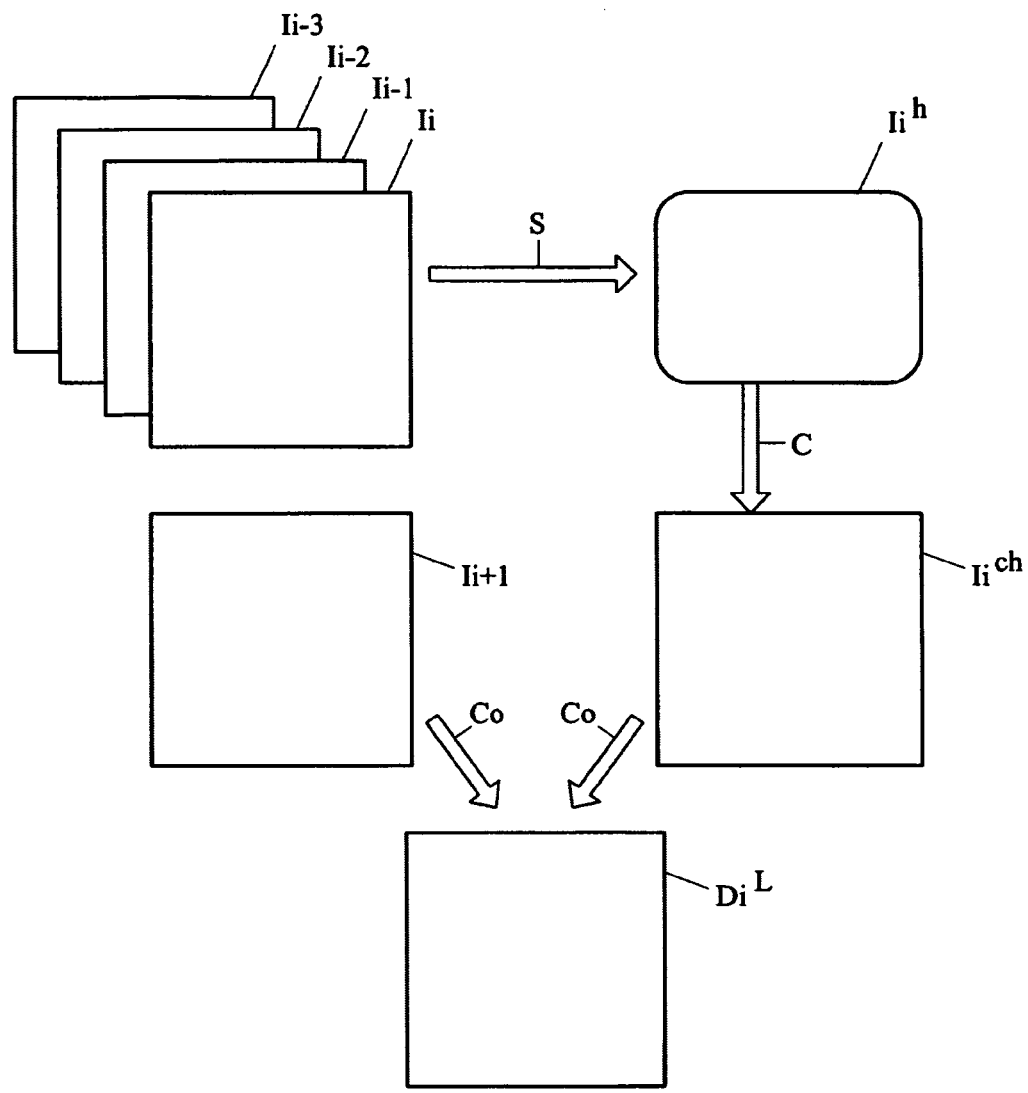
FIG. 2 shows an image processing algorithm according to a first embodiment of the invention.

FIG. 2 shows an image processing algorithm according to a first embodiment of the invention. Temporal subsequent images $I_{i-3}$, $I_{i-2}$, $I_{i-1}$, $I_i$ in the sequence of captured images are a basis for generating a high resolution image $I_i^h$, also called superresolution image. The superresolution image $I_i^h$ has a higher spatial resolution than the original captured images $I_{i-3}$, $I_{i-2}$, $I_{i-1}$, $I_i$.

Numerous algorithms to generate the superresolution image from the original images are known from the prior art, e.g. the Hardie algorithm, and are therefore not described herein. The step of generating the superresolution image is symbolically denoted as S. It is noted that four captured images can be used as a basis for the superresolution image $I_i^h$, as described above, but also other numbers of captured images can serve for this purpose, such as more than four, e.g. six or eight, or less than four, such as two or three. In general temporal noise and aliasing effects in the original images $I_{i-3}$, $I_{i-2}$, $I_{i-1}$, $I_i$ are reduced in the superresolution image $I_i^h$.

As a next step, a camera model is applied to the high resolution image $I_i^h$, so that an image $I_i^{Ch}$ is obtained that represents the high resolution image $I_i^h$ but substantially has the same spatial resolution as the original captured images $I_{i-3}$, $I_{i-2}$, $I_{i-1}$, $I_i$. The application of the camera model is symbolically denoted as C. In the camera model effects of a real camera are modelled, such as subsampling, blur due to optical lens effects of an optical sensor element in the camera and distortion due to a fill factor. However, no temporal noise is added in the camera model to preserve a relatively low noise level.

Then, a difference image $D_i^L$ is constructed by subtracting image values in corresponding pixels of the pair of images $I_i^{Ch}$ and $I_{i-1}$. This operation is symbolically denoted by Co. In order to obtain a high quality difference image $D_i^L$, the images $I_i^{Ch}$ and $I_{i-1}$ are corrected for the displacement of the camera which has been performed between subsequent capturing events.

The difference image $D_i^L$ comprises artefacts, such as errors in background registration and temporal noise, and information relating to moving objects to be detected. Due to the use of the superresolution image $I_i^h$ temporal noise and aliasing effects are reduced. According to the steps described above, a multiple number of difference images $D_i^L$, $D_{i+1}^L$, $D_{i+2}^L$, etc, are constructed in order to obtain moving object information. Subsequently, a retrieving step is performed which is described below in more detail.

Figure 3:
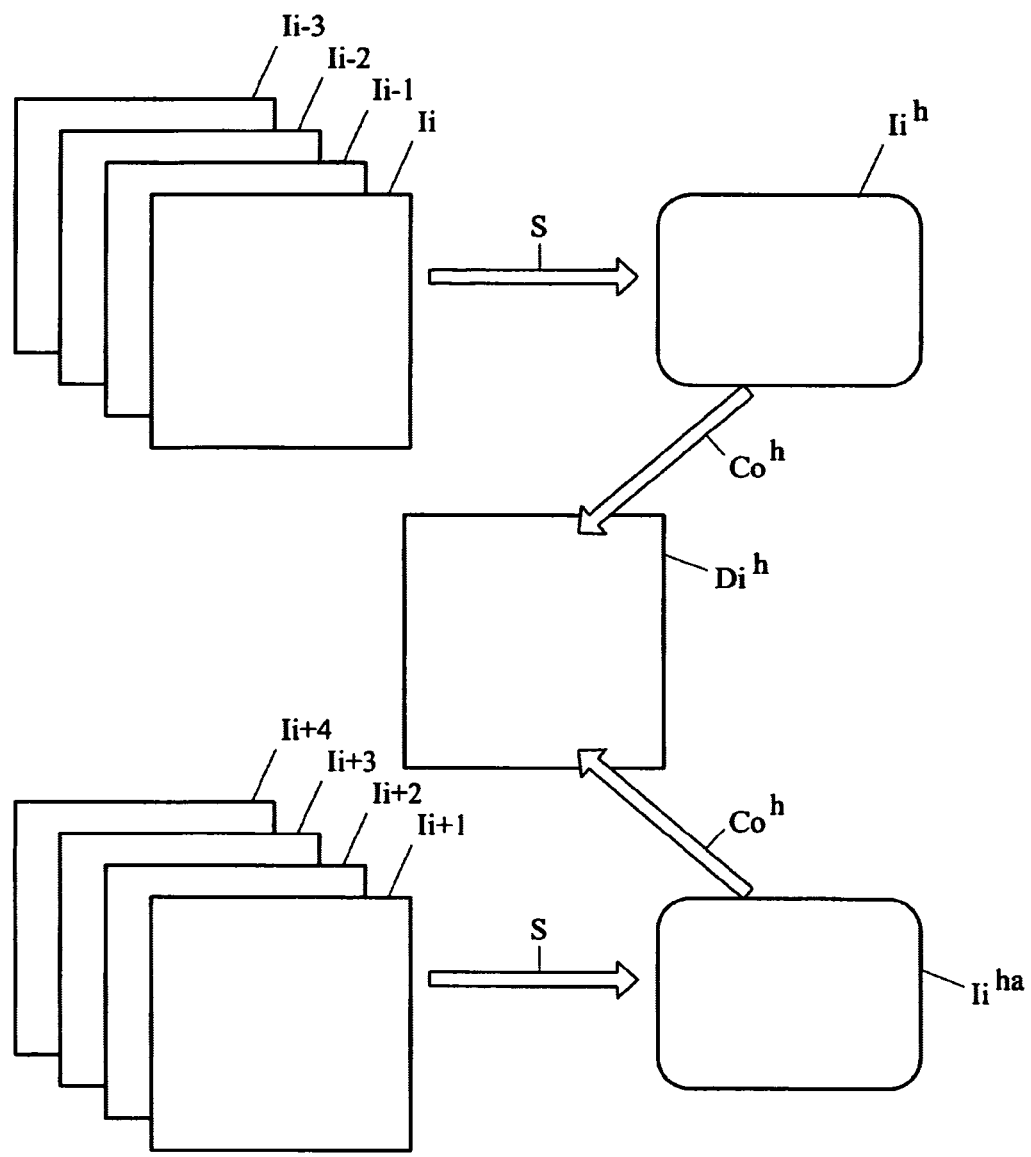
FIG. 3 shows an image processing algorithm according to a second embodiment of the invention.

FIG. 3 shows an image processing algorithm according to a second embodiment of the invention. Similarly as described with reference to the first embodiment of the invention, a superresolution image $I_i^h$ is generated on the basis of captured images $I_{i-3}$, $I_{i-2}$, $I_{i-1}$, $I_i$. Further, in the same way an additional superresolution image $I_i^{ha}$ is generated based on the basis of anticausal captured images $I_{i+1}$, $I_{i+2}$, $I_{i+3}$, $I_{i+4}$. Then, the superresolution image $I_i^h$ and the additional superresolution image $I_i^{ha}$ are used as input to the construction step $Co^h$ to form a difference image $D_i^H$ that has the same high spatial resolution as the superresolution images $I_i^h$ and $I_i^{ha}$. As a consequence, both images from the pair of images in the construction step $Co^h$ are a representation of high resolution images, respectively, in a high resolution domain. This is in contrast with the first embodiment of the invention wherein the images $I_i^{Ch}$ and $I_{i-1}$ are in a low resolution domain and wherein the difference image $D_i^L$ has the same or substantially the same spatial resolution as the captured images $I_{i-3}$, $I_{i-2}$, $I_{i-1}$, $I_i$. Again, according to the second embodiment of the invention, a multiple number of difference images $D_i^H$, $D_{i+1}^H$, $D_{i+2}^H$ in the high resolution domain are constructed.

After performing an image processing algorithm according to the first or second embodiment of the invention, a retrieving step R is performed that comprises extracting spatial information of pixels in the multiple number of constructed difference images having relatively large image values. In doing so, image values corresponding to specific pixels of a difference image are evaluated. If an absolute image value is larger than a threshold value, it is in principle decided that the corresponding pixel relates to a moving object.

In the prior art many threshold algorithms are know, such as static and dynamic thresholds, depending on one or a multiple number of parameters, such as e.g. temporal noise, etc. Such threshold algorithms are e.g. described in "Hand of Computer Vision algorithms in image algebra" by Gerhard X. Ritter and Joseph N. Wilson, 1996 CRC press, Inc., New York, Chapter 4 Thresholding techniques, and therefore not described in more detail here.

Figure 4:
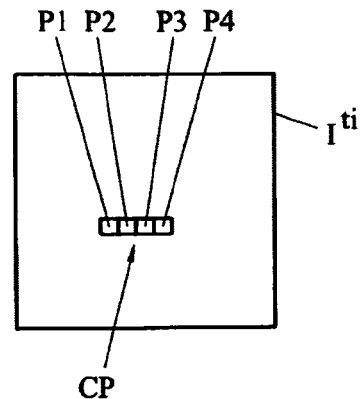
FIG. 4 shows a temporal integrated difference image having a clustered object.

FIG. 4 shows an image $I^{ti}$ that is obtained by temporal integration of differences images in which a thresholding algorithm is applied, i.e. by adding differences images wherein per pixel a moving object decision is performed in an affirmative sense. In the image $I^{ti}$, as an example, four pixel locations $P_1$, $P_2$, $P_3$, $P_4$ are decided to relate to a moving object. For elucidating purposes it is assumed that the moving object, such as a missile, moves from the left to the right and the in subsequent images, the moving object travels to a neighbouring pixel. Then, $P_1$ might be detected in $D_{i-4}$, $P_2$ in $D_{i-3}$, $P_3$ in $D_{i-2}$ and $P_4$ in $D_{i-1}$. It is noted that the moving object can also be detected in other directions in the temporal integrated difference image. Further, a particular pixel in the temporal integrated difference image might correspond to a plurality of coinciding pixels in individual subsequent images captured by the camera, so that the moving object for a limited number of captured images corresponds to a same pixel location and then transits to a neighbouring pixel location.

In addition, it is noted that as an alternative, the generation of the temporal integrated difference image can also be performed before per pixel a moving object decision is carried out.

Preferably, the pixels in the temporal integrated difference image $I^{ti}$ for which a moving object decision is performed in an affirmative sense, are clustered to form a clustered object CP. As a result, the process of detecting and tracking in time of a moving object can automatically be executed.

In an advantageous embodiment, a spatial filter is applied to the temporal integrated difference image to retrieve velocity information of the detected moving object, such as speed and velocity direction. Preferably, the spatial filter, has an elongate shape, so that point sources can be retrieved more easily, as in general the size of the moving object is small with respect to a distance that is covered by the object between a number of capturing instants of the camera.

Figure 5:
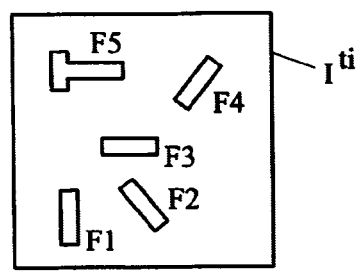
FIG. 5 shows a temporal integrated difference image on which spatial filters are projected.

In FIG. 5 a temporal integrated difference image is shown on which spatial filters F1, F2, F3, F4 and F5 are projected. The spatial filters have an elongate shape, preferably in the form of a line segment, see filters F1, F2, F3 and F4.

In a particular advantageous embodiment according to the invention, the spatial filter is applied in a multiple number of spatial orientations to the temporal integrated difference image, so that a velocity direction of a detected moving object can be retrieved in an automated process more easily and reliably, thereby reducing the chance that a moving object is not detected due to an unusual flight direction.

It is noted that the feature of applying the spatial filter in a multiple number of spatial orientations is not restricted to the method described in claim 1. The feature of applying the spatial filter in a multiple number of spatial orientations to a temporal integrated difference image can viz. also in general be applied to a method for detecting a moving object in a sequence of images captured by a moving camera, comprising the steps of constructing a multiple number of difference images by subtracting image values in corresponding pixels of multiple pairs of images being based on captured images and retrieving a moving object by extracting spatial information of pixels in the multiple number of constructed difference images having relatively large image values.

Optionally, the method according to the invention further comprises tracking a clustered object in difference images or temporal integrated difference images to enhance the robustness of the algorithm.

Figure 6:
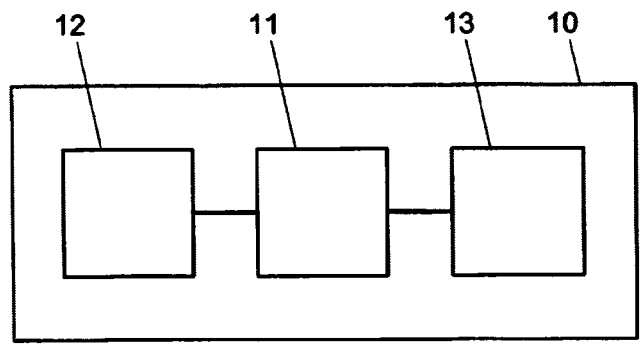
FIG. 6 shows a computer system according to the invention.

FIG. 6 depicts a computer system 10 according to the invention. The computer system comprises a processor 11 that is connected to input means 12 to read image data of the images that are captured by the camera. Further, the processor 11 is connected to output means 13 to output data resulting from processing steps on the image data according to the method of the invention.

The method according to the invention can be implemented in application software. However, the method according to the invention can also be implemented in hardware, such as FPGA or DSP applications.

The invention is not restricted to the embodiments described herein. It will be understood that many variants are possible.

Instead of using an IR camera, a visible light camera can be employed. Further, the camera might comprise a light enhancement module or other active and/or passive optical modules to capture images.

Other such variants will be obvious for the person skilled in the art and are considered to lie within the scope of the invention as formulated in the following claims.

The invention claimed is:

1. A method for detecting a moving object in a sequence of images captured by a moving camera, comprising the steps of
    a. displacing a camera mounted on a platform so that a sequence of images having different views are captured;
    b. processing a sequence set of images to generate a super-resolution image having a higher spatial resolution than the resolution of the original sequence set of captured images;
    c. constructing a multiple number of difference images by subtracting image values in corresponding pixels of the super-resolution image and a sequence set of captured images; and
    d. retrieving a moving object by extracting spatial information of pixels in the multiple number of constructed difference images having relatively large image values,
    e. wherein, in construction step c. an image constructed from a pair of images is a representation of a high resolution image having a higher spatial resolution than original captured images on which the high resolution image is based with noise and/or aliasing effects suppressed; and
    f. wherein the super-resolution image obtained in step b. is further processed by applying a camera model to the super-resolution image resulting in an image having real camera effects and having substantially the same spatial resolution as the original captured images on which the super-resolution image is based.

2. A method according to claim 1, wherein the difference images in the constructing step are both super-resolution images each having a higher spatial resolution than original captured images on which the super-resolution images are based.

3. A method according to claim 1, wherein original captured images on which a super-resolution image is based form temporal subsequent images in the sequence of images captured by the camera.

4. A method according to claim 1, wherein extracting spatial information comprises clustering pixels in the multiple number of constructed difference images having relatively large image values to a clustered object.

5. A method according to claim 1, further comprising the step of generating a temporal integrated difference image based on a multiple number of difference images.

6. A method according to claim 5, wherein extracting spatial information comprises applying a spatial filter to a temporal integrated difference image.

7. A method according claim 6, wherein the spatial filter has an elongate shape.

8. A method according to claim 6, wherein the spatial filter is applied in a multiple number of spatial orientations to the temporal integrated difference image.

9. A method according to claim 5, further comprising the step of tracking a clustered object in one of difference images and temporal integrated difference images.

10. Computer system comprising a processor for detecting a moving object in a sequence of images captured by a moving camera, the processor being configured to construct multiple difference images by subtracting image values in corresponding pixels of multiple pairs of images based on captured images wherein one of the images of the pair is a super-resolution image derived from captured images, and to retrieve a moving object by extracting spatial information of pixels having relatively large image values in the constructed difference images, wherein an image constructed from a pair of images is a representation of a high resolution image having a higher spatial resolution than original captured images on which the high resolution image is based with noise and/or aliasing effects preserved and wherein the processor is further configured to apply a camera model to the super-resolution image resulting in an image having real camera effects and having substantially the same spatial resolution as the original captured images on which the super-resolution image is based.

11. A non-transitory computer readable media containing non-transitory instructions for programming a computer including a processor for detecting a moving object in a sequence of images captured by a moving camera, the non-transitory instructions controlling the processor of the computer to construct a multiple number of difference images by subtracting image values in corresponding pixels of multiple pairs of images being based on captured images, wherein at least one image of a pair of images is a super-resolution image derived from captured images, and to retrieve a moving object by extracting spatial information of pixels in the multiple number of constructed difference images having relatively large image values in the of constructed difference images, wherein an image constructed from a pair of images is a representation of a high resolution image having a higher spatial resolution than original captured images on which the high resolution image is based with noise and/or aliasing effects suppressed and wherein the non-transitory instuctions control the processor of the computer to apply a camera model to the super-resolution image resulting in an image having real camera effects and having substantially the same spatial resolution as the original captured images on which the super-resolution image is based.

12. A method for detecting a moving object in a sequence of images captured by a moving camera, comprising the steps of
 a. capturing a sequence of images by a moving camera;
 b. constructing a multiple number of difference images by subtracting image values in corresponding pixels of multiple pairs of images based on images from the sequence of captured images, wherein at least one image of a pair is a super-resolution image derived from captured images and having a higher spatial resolution than original captured images and wherein noise levels and/or aliasing are suppressed in the difference images; and
 c. retrieving a moving object by extracting spatial information of pixels in the multiple number of constructed difference images having relatively large image values, wherein the super-resolution image is further processed by applying a camera model to the super-resolution image resulting in an image having real camera effects and having substantially the same spatial resolution as the original captured images on which the super-resolution image is based.

* * * * *

UNITED STATES PATENT AND TRADEMARK OFFICE
CERTIFICATE OF CORRECTION

PATENT NO.        : 8,629,908 B2                                          Page 1 of 1
APPLICATION NO.   : 12/515445
DATED             : January 14, 2014
INVENTOR(S)       : Schutte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this
Twenty-second Day of September, 2015

Michelle K. Lee
*Director of the United States Patent and Trademark Office*